(12) United States Patent
Lin et al.

(10) Patent No.: US 10,282,915 B1
(45) Date of Patent: May 7, 2019

(54) SUPERIMPOSITION DEVICE OF VIRTUAL GUIDING INDICATION AND REALITY IMAGE AND THE SUPERIMPOSITION METHOD THEREOF

(71) Applicant: Industrial Technology Research Institute, Hsinchu (TW)

(72) Inventors: Jing-Jhih Lin, Hualien County (TW); Wei-Cheng Liu, Hsinchu County (TW); Yu-Chen Lin, Taichung (TW); Cheng-Hsien Wang, Taichung (TW); Peng-Cheng Chen, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/857,230

(22) Filed: Dec. 28, 2017

(30) Foreign Application Priority Data

Dec. 27, 2017 (TW) .............................. 106145977 A

(51) Int. Cl.
*G09G 5/00* (2006.01)
*G06T 19/00* (2011.01)
(Continued)

(52) U.S. Cl.
CPC ........ *G06T 19/006* (2013.01); *G01C 21/3635* (2013.01); *G01C 21/3647* (2013.01);
(Continued)

(58) Field of Classification Search
CPC ... G06T 19/006; G06T 17/00; G01C 21/3635; G01C 21/3647; G02B 27/0101
(Continued)

(56) References Cited

U.S. PATENT DOCUMENTS

2001/0043212 A1* 11/2001 Sone ....................... G06T 15/20
345/427
2010/0134593 A1* 6/2010 Kakinami ................. B60R 1/00
348/43
(Continued)

FOREIGN PATENT DOCUMENTS

CN           105466444 A      4/2016
JP        2012147149 A  *  8/2012 ............... B60R 1/00
(Continued)

OTHER PUBLICATIONS

Limmer et al., "Robust Deep-Learning-Based Road-Prediction for Augmented Reality Navigation Systems at Night," 2016 IEEE 19th Int'l. Conference on Intelligent Transportation Systems, Nov. 2016, 8 pages, IEEE, US.
(Continued)

*Primary Examiner* — Sarah Lhymn

(57) ABSTRACT

A superimposition device of virtual guiding indication and reality image includes at least an image capturing device, a processor, a graphic processing unit (GPU), and a display device. The image capturing device captures reality image including instant scene. The processor receives the reality image and obtains height variation information. The GPU performs image correction processing on the reality image to obtain corrected image, generates updated transformation matrix according to the height variation information, and performs inverse perspective projection transformation by using the updated transformation matrix to generate bird's-eye view image of the corrected image and superimposes virtual guiding indication on the bird's-eye view image and performs perspective projection transformation on the bird's-eye view image to transform the bird's-eye view image into three-dimensional (3D) navigation image which includes the guiding indication. The display device displays
(Continued)

the 3D navigation image which superimposes the virtual guiding indication into the reality image.

16 Claims, 7 Drawing Sheets

(51) Int. Cl.
  *G06T 17/00* (2006.01)
  *G02B 27/01* (2006.01)
  *G01C 21/36* (2006.01)
(52) U.S. Cl.
  CPC .......... *G02B 27/0101* (2013.01); *G06T 17/00* (2013.01); *G06T 2207/30256* (2013.01)
(58) Field of Classification Search
  USPC .......................................... 345/619, 632, 633
  See application file for complete search history.

(56) References Cited

U.S. PATENT DOCUMENTS

| | | | |
|---|---|---|---|
| 2012/0224060 A1* | 9/2012 | Gurevich | B60R 1/00 348/148 |
| 2013/0051611 A1 | 2/2013 | Hicks | |
| 2013/0293582 A1 | 11/2013 | Ng-Thow-Hing et al. | |
| 2014/0136043 A1* | 5/2014 | Guarnizo Martinez | B60W 40/13 701/23 |
| 2014/0268353 A1* | 9/2014 | Fujimura | G02B 27/0101 359/630 |
| 2014/0362195 A1* | 12/2014 | Ng-Thow-Hing | G06K 9/00791 348/51 |
| 2015/0302560 A1* | 10/2015 | Sumiyoshi | G09G 3/001 382/203 |
| 2018/0005434 A1* | 1/2018 | Ren | G06T 17/05 |

FOREIGN PATENT DOCUMENTS

| | | |
|---|---|---|
| TW | I305829 | 2/2009 |
| TW | 201137313 A | 11/2011 |
| TW | I408342 | 9/2013 |
| TW | I434239 | 4/2014 |
| TW | 201447230 A | 12/2014 |
| TW | M523091 U | 6/2016 |
| TW | 201715476 A | 5/2017 |

OTHER PUBLICATIONS

Gabbard et al., "Behind the Glass: Driver Challenges and Opportunities for AR Automotive Applications," Proceedings of the IEEE, Feb. 2014, pp. 124-136, vol. 102, issue 2, IEEE US.

Alvarez et al., "Road Scene Segmentation from a Single Image," European Conference on Computer Vision, Lecture Notes in Computer Science, 2012, pp. 376-389, vol. 7578, Springer-Verlag, Berlin, Heidelberg.

Deusch et al., "Multi-Sensor Self-Localization Based on Maximally Stable Extremal Regions," 2014 IEEE Intelligent Vehicles Symosium (IV), Jun. 2014, p. 555-560, IEEE, US.

Schule et al., "Augmenting Night Vision Video Images with Longer Distance Road Course Information," 2013 IEEE Intelligent Vehicles Symposium (IV), Jun. 2013, pp. 1233-1238, IEEE, US.

Lee et al., "Development of Lane-level Guidance Service in Vehicle Augmented Reality System," 2015 17th International Conference on Advanced Communication Technology, Jul. 2015, pp. 263-266, IEEE, US.

Taiwan Patent Office, Office Action, Patent Application Serial No. 106145977, dated Nov. 21, 2018, Taiwan.

* cited by examiner

SUPERIMPOSITION DEVICE OF VIRTUAL GUIDING INDICATION AND REALITY IMAGE AND THE SUPERIMPOSITION METHOD THEREOF

TECHNICAL FIELD

The technical field relates to superimposition devices of a virtual guiding indication and a reality image and associated superimposition methods for superimposing the virtual guiding indication and the reality image thereof.

BACKGROUND

In recent years, Global Positioning System (GPS) has been widely used in navigation systems of various electronic devices, such as a mobile phone or a car, which receives satellite signals and locates the electronic device having a GPS receiver to determine the position of the electronic device based on the relative position of each of the satellites. Users may also use the navigation software in the electronic device to perform route planning and navigation operations. Generally, when the users want to move from a starting point to a destination, the navigation software may plan a route according to a specific algorithm to guide the users to know the direction of travel.

As the development of augmented reality technology has become more and more mature, navigation systems with augmented reality (AR) function have also been developed. A navigation system with AR navigation function can use satellite positioning, image recognition and map data to match the reality image acquired by a camera lens of the mobile phone, so that the virtual world on the navigation screen can be combined and interacted with scenes in the real world to generate a virtual guiding indication in the reality image to perform direction guidance to provide drivers with more intuitive guidance information.

However, although the navigation system with AR navigation function may provide the drivers with more intuitive guidance information, for existing navigation systems with AR navigation function, statuses in front of the vehicle will not be taken into consideration when the virtual guiding indications are superimposed on the reality image. When there is another vehicle in front of the vehicle, the guiding indication may obscure the preceding vehicle, such that the user may ignore the statuses in front of the vehicle and causes a collision accident when viewing the guidance information. In addition, some navigation systems with AR navigation function do not identify the drivable areas. Therefore, when the vehicle is driving in a complex road environment such as a multi-lane road, a three-dimensional road or the like, it will not be able to provide the correct guidance direction. In addition, current navigation systems with AR navigation function do not consider the proportional relationship between the guiding indication and pixels of the reality image in superimposing the guiding indication on the reality image, thereby making the guiding indication look like guiding to the sky. For example, when the vehicle is driving on a road with a height variation, the guiding line displayed by the guiding indication for navigation may look like a guiding direction toward the sky or below the ground and thus cannot accurately represent correct three-dimensional (3D) guiding indications. Therefore, the guiding indication displayed may have a gap with the actual scenery, and would result in the vehicle driver not clearly understanding the directions being guided in real time, thus causing inconsistency with the route to be navigated and the navigational purpose not being successfully achieved.

SUMMARY

Superimposition devices of a virtual guiding indication and a reality image and related superimposition methods for superimposing a virtual guiding indication and a reality image are provided.

An exemplary embodiment of a superimposition device of a virtual guiding indication and a reality image comprises at least an image capturing device, a processor, a graphic processing unit (GPU), and a display device. The image capturing device is deposited in front of a vehicle for capturing a reality image including a real-time scene. The processor is connected to the image capturing device for receiving the reality image and obtains height variation information, wherein the height variation information includes a current altitude data of the vehicle and an altitude data for the road in front of the vehicle. The GPU is connected to the processor for performing an image correction processing on the reality image to obtain a corrected image, generating an updated transformation matrix according to the height variation information, performing an inverse perspective projection transformation on the corrected image using the updated transformation matrix to generate a bird's-eye view image of the corrected image, generating a virtual guiding indication according to a route planning information, and superimposing the virtual guiding indication on the bird's-eye view image and then performing a perspective projection transformation on the bird's-eye view image to transform the bird's-eye view image into a three-dimensional (3D) navigation image, wherein the 3D navigation image includes the virtual guiding indication. The display device is connected to the processor for displaying the 3D navigation image.

In another exemplary embodiment, a superimposition method for superimposing a virtual guiding indication and a reality image applied to a superimposition device deposited on a vehicle and implemented by the superimposition device is provided. The method comprises the steps of: capturing a reality image including a real-time scene and obtaining height variation information, wherein the height variation information includes a current altitude data of the superimposition device and an altitude data for the road in front of the vehicle; performing an image correction processing on the reality image to obtain a corrected image; generating an updated transformation matrix according to the height variation information and performing an inverse perspective projection transformation on the corrected image using the updated transformation matrix to generate a bird's-eye view image of the corrected image; generating a virtual guiding indication according to a route planning information and superimposing the virtual guiding indication on the bird's-eye view image; and performing a perspective projection transformation on the bird's-eye view image to transform the bird's-eye view image into a three-dimensional (3D) navigation image, wherein the 3D navigation image includes the virtual guiding indication.

Methods disclosed above may be practiced by disclosed device or system which is hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The application will become more fully understood by referring to the following detailed description with reference to the accompanying drawings, wherein:

FIG. 8A is a schematic diagram illustrating an exemplary embodiment of a superimposing effect of a virtual guiding indication and a reality image without considering the height variation on the road plane while

DETAILED DESCRIPTION OF EMBODIMENTS

Figure 1:
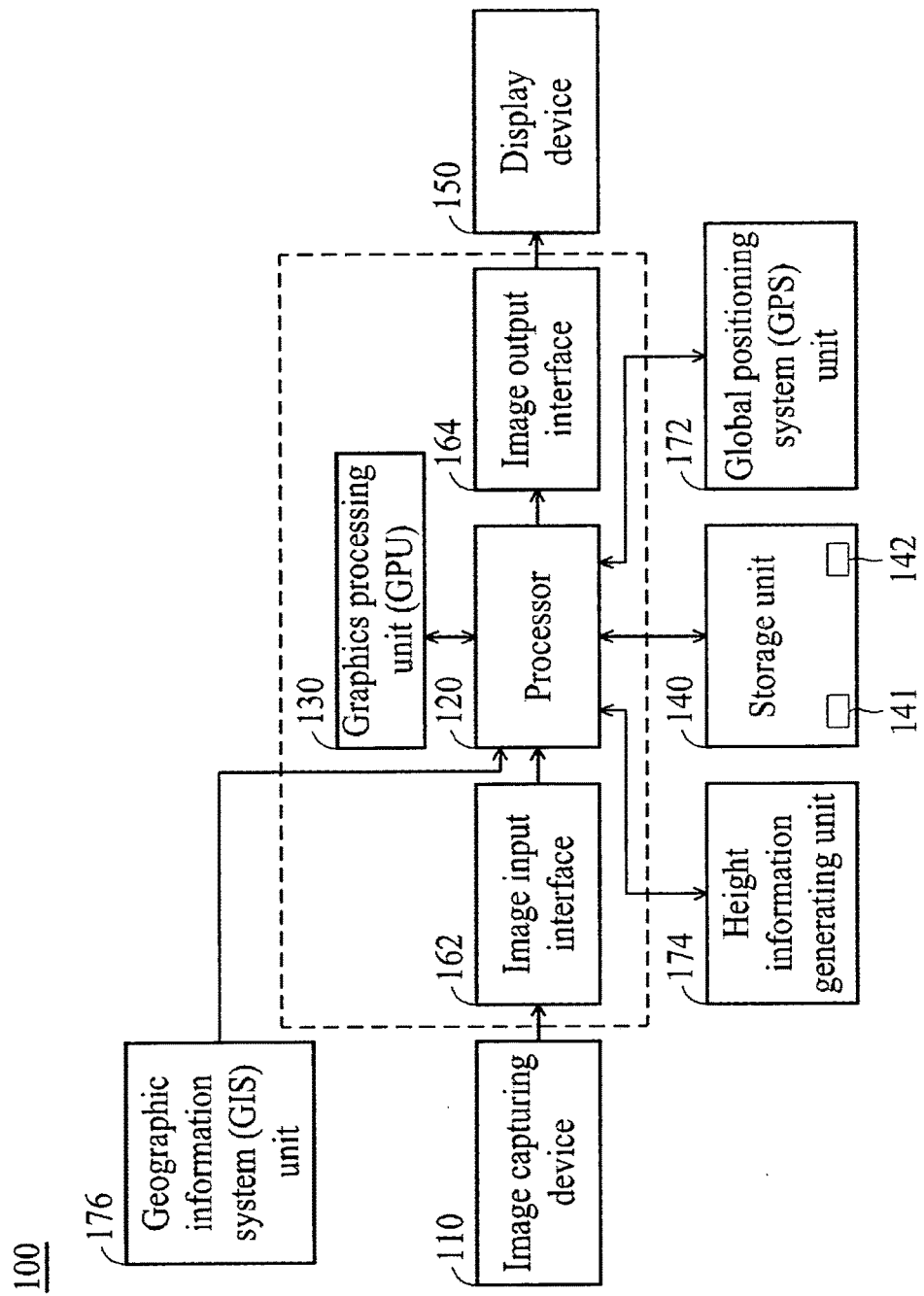
FIG. 1 is a block diagram illustrating a superimposition device of a virtual guiding indication and a reality image according to an embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that the embodiments may be realized in software, hardware, firmware, or any combination thereof.

Embodiments of the application provide superimposition devices of a virtual guiding indication and a reality image and related superimposition methods for superimposing the virtual guiding indication and the reality image, which can perform a perspective projection transformation and an inverse perspective projection transformation according to height variation information of the road, and with considering visual sense of reality for superimposing the virtual guiding indication and the reality image, convert the virtual guiding indication into a bird's-eye (overhead) image coordinate system with height variation in advance using an updated inverse perspective projection transformation matrix according to a change in height, and then convert it into a reality image coordinate system using a perspective projection transformation, such that the virtual guiding indication in the reality image has a correct pixel proportional relationship, and at the same time, avoid the appearance of an erroneous display that appears to float and point to the sky caused by directly superimposing the virtual guiding indication on the reality image, thus providing the driver with a more correct and intuitive 3D guiding indication for navigation purposes.

FIG. 1 is a block diagram illustrating a superimposition device of a virtual guiding indication and a reality image according to an embodiment of the application. The superimposition device 100 of the virtual guiding indication and reality image can be an electronic device, such as a computer system and a portable device such as a mobile device (e.g., a tablet computer, a smartphone, or a wearable computing device), a laptop computer capable of processing image or video data or can be provided by multiple devices. The superimposition device 100 of the virtual guiding indication and the reality image can be used to provide navigation functions. The superimposition device 100 of the virtual guiding indication and the reality image can also be implemented as multiple chips or a single ship such as a system on chip (SOC) or a mobile processor disposed in a mobile device. For example, the superimposition device 100 of the virtual guiding indication and the reality image comprises a plurality of image capturing devices 110, a processor 120, a graphics processing unit (GPU) 130, a storage unit 140, a display device 150, an image input interface 162, an image output interface 164, a global positioning system (GPS) unit 172, a geographic information system (GIS) unit 176, and a height information generating unit 174. The GPU 130, the storage unit 140, the display device 150, the image input interface 162, the image output interface 164, the GPS unit 172, the height information generating unit 174 and the GIS unit 176 can be coupled to the processor 120 to perform various operations under the control of the processor 120. The image capturing device 110 may be a camera module including one or more image sensors. The image sensors may be a single sensor or a sensor array including a plurality of individual or separate sensor units. For example, the image capturing device 110 can be a camera module with a fisheye lens for capturing a real-time image including real-time traffic. In one embodiment, multiple image capturing devices 110 may be disposed in front of a vehicle for capturing/photographing real-time road image.

The processor 120 may be a central processing unit (CPU) general-purpose processor, a digital signal processor (DSP), or any equivalent circuitry, but the application is not limited thereto.

The storage unit 140 may include a volatile memory 141 and a non-volatile memory 142. For example, the volatile memory 141 may be a dynamic random access memory (DRAM) or a static random access memory (SRAM), and the non-volatile memory 142 may be a flash memory, a hard disk, a solid-state disk (SSD), etc.

For example, the program codes of the applications for use on the superimposition device 100 of the virtual guiding indication and the reality image can be pre-stored in the non-volatile memory 142. The processor 120 may load program codes of applications from the non-volatile memory 142 to the volatile memory 141, and execute the program code of the applications. The processor 120 may also transmit the graphics data to the GPU 130, and the GPU 130 may determine the graphics data to be rendered on the display device 150. It is noted that although the volatile memory 141 and the non-volatile memory 142 are illustrated as a memory unit, they can be implemented separately as different memory units. The display device 150 can be a display circuit or hardware that can be coupled for controlling a display screen (not shown) such as a Liquid-Crystal Display (LCD). The display device 150 may include either or both of a driving circuit and a display panel and the display device 150 can be disposed internal or external to the superimposition device 100 of the virtual guiding indication and the reality image. In some embodiments, the display device 150 may be a screen integrated with a touch-sensitive device (not shown). The touch-sensitive device has a touch-sensitive surface comprising sensors in at least one dimension to detect contact and movement of at least one input tool, such as a pen/stylus or finger near or on the touch-sensitive surface. Accordingly, users are able to input commands or signals via the display device 150.

The storage unit 140 may further store map data corresponding to at least one specific region, such as an area or a country. The map data may comprise doorplate addresses, landmarks, scenic spots, and/or road and information thereof.

The display device 150 displays related data, such as a user interface, route planning results, and related navigation information. The processor 120 may further include a navigation engine having a route planning capability. Users may input navigation conditions, such as a starting point, a destination, and/or at least one mid-point via the user interface. The processor 120 performs route planning according to the starting point, the mid-point and the destination to obtain route planning information. Users may be navigated to the destination according to the route planning information.

The GPS unit 172 may receive satellite signals. The GPS unit 172 may obtain position coordinate information of the position of the device 100. For example, the GPS unit 172 can be a GPS sensor (e.g., a GPS receiver), which may receive satellite signals to obtain a GPS signal, generate a GPS position according to the obtained GPS signal and obtains GPS coordinate information of the location of the device 100. The processor 120 may calculate a current position of the device 100 based on the received signals.

The image input interface 160 receives original images (e.g., fish-eye images) captured by the image capturing device 110 and provide the original images to the processor 120. The image output interface 164 obtains display image data received by the processor 120 from the GPU 130 and provides the display image data to the display device 150 for display. The GPS unit 172 may further be used to provide and output the real-time position of the vehicle. The GIS unit 176 provides the above map information and terrain related information such as height. The height information generating unit 174 can be a device that can be used to obtain the current altitude of the vehicle and the altitude of the road ahead of the vehicle, such as, a GPS unit, an altimeter, and the like, but the application is not limited thereto.

In some embodiments, although not shown, the superimposition device 100 of the virtual guiding indication and the reality image may comprise other functional units, such as a keyboard/keypad, a mouse, a touchpad, or a communication unit, such as an Ethernet card or chipset, a Wireless-Fidelity (WiFi) card or chipset, a baseband chipset and a Radio Frequency (RF) chipset for cellular communications.

The processor 120 can perform the superimposition method for superimposing the virtual guiding indication and reality image of the present application, which will be discussed further in the following paragraphs. Specifically, multiple image capturing devices 110 may be disposed in front of the vehicle to capture/shoot real-time road traffic images. The processor 120 is connected to the image capturing device 110, the GPS unit 172, the GIS unit 176, and the height information generating unit 174, and may control the operations of the image capturing device 110, the GPS unit 172, the height information generating unit 174, and the GIS unit 176 to be used as a data transmission bridge thereamong. The GPU 130 is connected to the processor 110, which generates a virtual guiding indication according to the route planning information, compares the instant position and height of the vehicle, and obtains a driving route. The GPU 130 may use an inverse perspective projection algorithm that takes into account the height variation to generate a virtual guiding image in the reality image according to the height variation information. In some embodiments, the virtual guiding indication generated by the GPU 130 is being mapped to a coordinate system for a bird's-eye view image with the height variation according to the height variation using an updated inverse perspective projection transformation matrix and then being mapped back to a coordinate system for a reality image through a perspective projection transformation so as to superimpose the virtual guiding indication on the instant road traffic condition and generate the virtual guiding image in the reality image.

The display device 150 is connected to the processor 120 for displaying the virtual guiding images superimposed on the instant road traffic condition. In some embodiments, the virtual guiding image can be a three-dimensional (3D) image, which is attached to the ground of the road according to the height variation. The display device 150 may further provide a user interface (not shown) for intuitively displaying the road traffic information and the real road guiding image to the user, such as the driver of the vehicle, through the user interface to provide a driving path reference for the user.

In some embodiments, the GIS unit 176 is compared with the GPS unit 172 to obtain the gradient of the road ahead. In some embodiments, the display device 150 may be disposed beside the driver position of the vehicle and used to display a navigation image superimposing the road condition in front and the virtual guiding indication. In some embodiments, the user interface of the display device 150 may display the actual altitude of the vehicle and the altitude of the road image in front of the vehicle.

It should be understood that each of the elements or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods.

In the embodiments of the present application, the GPU 130 may perform a perspective projection transformation and respective inverse perspective projection transformation according to height variation information of a road to update the inverse perspective projection transformation matrix to transform the virtual guiding indication to correspond to the coordinate system for the bird's-eye (vertical view) image with the height variation, and then transforms it back into the coordinate system for the reality image through the perspective projection transformation. Details and algorithms of which will be discussed further in the following paragraphs.

First, the camera model of the image capturing device 110 used in the embodiments of the present application is a pinhole-camera model, and the GPU 130 may transform the camera coordinates to the image coordinates through the pinhole-camera model. Thereafter, the GPU 130 can perform subsequent operations of image distortion correction and inverse perspective projection transformation.

Figure 2:
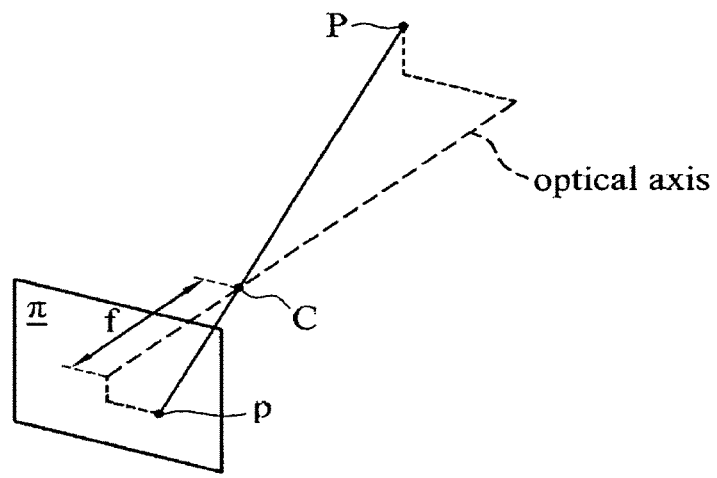
FIG. 2 is a schematic diagram of a camera model of an image capturing device according to an embodiment of the application.

FIG. 2 is a schematic diagram of a camera model of the image capturing device according to an embodiment of the application. As shown in FIG. 2, $\pi$ represents an image plane, point C is the imaging center point in which a vector direction from the point C extended vertically to the image plane is defined as its optical axis, point p is a projection point of any point P in the camera coordinate system projected onto the image plane, $f$ is the focal length of the camera, wherein the coordinate origin of the camera coordinate system is defined as the imaging center point C, and the X-axis and Y-axis are parallel to the x-axis and y-axis of the image plane respectively, and the Z-axis is the optical axis.

According to the similar triangle theorem, the GPU 130 can transform the camera coordinate system to the image coordinate system by the following formula (1):

$$x = S_x f \frac{X_C}{Z_C}, \quad y = S_y f \frac{Y_C}{Z_C}, \quad (1)$$

wherein $S_x, S_y$ are the scale factors for the scaling along with x-axis and y-axis of the image plane respectively and $f$ is the focal length. Since the image plane is in unit of pixels, and the unit of the focal length $f$ is millimeter, it needs to be transformed onto each other by a scale transformation scaling factor, wherein $f$, $S_x, S_y$ can also be referred to as camera intrinsic parameters.

In general, the image origin utilized in the image processing is defined as the point at the upper left corner of the image, and the above camera model defines the image origin as the image center point, so the formula (1) can be rewritten as the following formula (2) in this embodiment:

$$x = \frac{x_{size}}{2} + S_x f \frac{X_C}{Z_C}, \quad y = \frac{y_{size}}{2} + S_y f \frac{Y_C}{Z_C}. \quad (2)$$

In addition, the image capturing device 110 (e.g., a camera) often carries lens to increase the amount of light entering the image plane per unit time to shorten the time required for the exposure process, but the mounted lens usually have the fish-eyes (wide-angle) characteristic and will cause distortion of the image, and distortion of the image will cause the true ratio relationship of subsequent images to be incorrect. Therefore, it is necessary to perform image distortion correction on the original image. In the embodiments of the present application, the distortion of the image can be divided into two types of distortions: pincushion distortion and barrel distortion. Thus, the GPU 130 can perform image distortion correction on the original image through the following formula (3) (also called distortion correction equation):

$$x_{corrected} = x \frac{(1 + k_1 r^2 + k_2 r^4 + k_3 r^6)}{(1 + k_4 r^2 + k_5 r^4 + k_6 r^6)} + (2 p_1 xy + p_2 (r^2 + 2x^2)) \quad (3)$$

$$y_{corrected} = x \frac{(1 + k_1 r^2 + k_2 r^4 + k_3 r^6)}{(1 + k_4 r^2 + k_5 r^4 + k_6 r^6)} + (p_1 (r^2 + 2y^2) + 2 p_2 xy),$$

wherein in the equation (3), $k_1, k_2, k_3, k_4, k_5, k_6$ are referred to as the barrel distortion parameters of the camera, and $p_1, p_2$ are referred to as the pincushion distortion parameters of the camera in which $r^2 = x^2 + y^2$. The above-mentioned parameters can be obtained when the camera being used has been determined.

Furthermore, since the lens of the camera are deposited at a position in front of the vehicle, it is necessary to define the relationship between the camera coordinate system and the world coordinate system.

Figure 3:
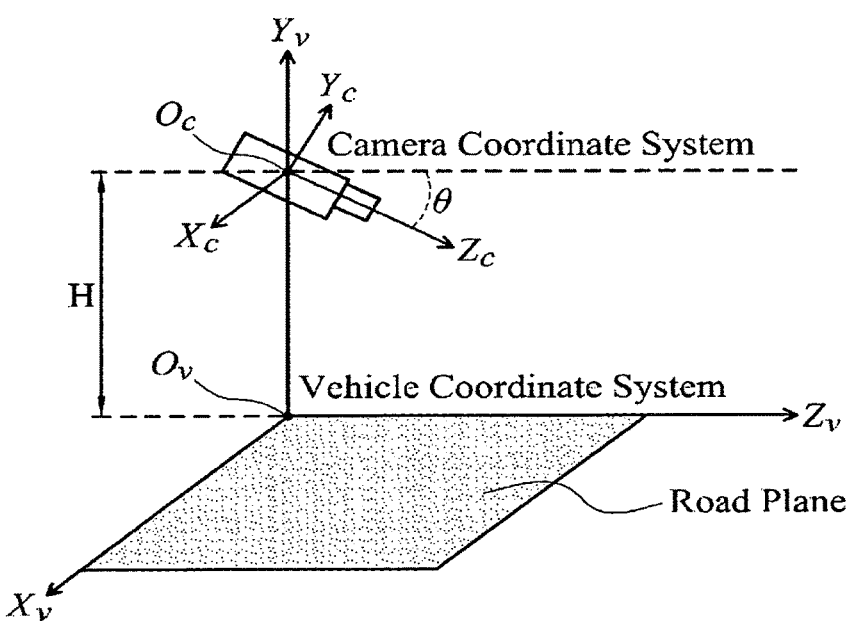
FIG. 3 is a schematic diagram illustrating an exemplary embodiment of the relationship between a camera coordinate system and a world coordinate system.

FIG. 3 is a schematic diagram illustrating an exemplary embodiment of the relationship between the camera coordinate system and the world coordinate system. As shown in FIG. 3, in this embodiment, the lens are being placed at the front glass position of the vehicle and are located at a height H above the flat ground. The camera coordinate system is defined as $(X_C, Y_C, Z_C)$, $O_C$ is the camera origin and camera imaging center, and a tilt angle between the optical axis and $Z_C$ is defined as $\theta$.

It should be understood that any three-dimensional (3D) coordinate system in the real world may be referred to as the world coordinate system, i.e., a vehicle coordinate system as shown in FIG. 3. As shown in FIG. 3, the vehicle coordinate system and a camera coordinate system differ only in the coordinate origin position and the coordinate axis direction. Therefore, any point $P_V(X_V, Y_V, Z_V)$ on the vehicle coordinate system can be transformed into a point $P_C(X_C, Y_C, Z_C)$ on the camera coordinate system through a transformation matrix. The relationship equation (4) therebetween can be represented as follows:

$$P_C^T = M_{V.C} P_V^T \quad (4),$$

where $M_{V.C}$ is the transformation matrix, which can be expressed as $M_{V.C} = R_{X,-\theta} T_{y,-H}$, in which $R_{X,-\theta}$ and $T_{Y,-H}$ are also referred to as camera extrinsic parameters, which can be expressed as follows:

$$M_{v,c} = \begin{bmatrix} 1 & 0 & 0 & 0 \\ 0 & \cos\theta & \sin\theta & -H\cos\theta \\ 0 & -\sin\theta & \cos\theta & H\sin\theta \\ 0 & 0 & 0 & 1 \end{bmatrix},$$

$$R_{X,-v} = \begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix}, \quad T_{T,-H} = \begin{bmatrix} 1 & 0 & 0 & 0 \\ 0 & 1 & 0 & -H \\ 0 & 0 & 1 & 0 \\ 0 & 0 & 0 & 1 \end{bmatrix}.$$

Through the above relationship equation (4), the GPU 130 may transform any point $P_V(X_V, 0, Z_V)$ in the roadway plane $(X_V - Z_V)$ on the vehicle coordinate system onto a point $P_C(X_C, Y_C, Z_C)$ on the camera coordinate system by the transformation matrix $M_{V.C}$ and the above transformation is performed by the transformation matrix. A relationship equation (5) that performs the above transformation to transform a point onto the camera coordinate system can be expressed as follows:

$$\begin{bmatrix} X_c \\ Y_c \\ Z_c \\ 1 \end{bmatrix} = \begin{bmatrix} 1 & 0 & 0 & 0 \\ 0 & \cos\theta & \sin\theta & -H\cos\theta \\ 0 & -\sin\theta & \cos\theta & H\sin\theta \\ 0 & 0 & 0 & 1 \end{bmatrix} \begin{bmatrix} X_v \\ 0 \\ Z_v \\ 1 \end{bmatrix} = \begin{bmatrix} X_v \\ Z_v\sin\theta - H\cos\theta \\ Z_v\cos\theta + H\sin\theta \\ 1 \end{bmatrix}. \quad (5)$$

Then, the GPU 130 may transform a point of the camera coordinate system into a respective point of an image plane coordinate system by using the camera pinhole imaging principle described above and using the camera intrinsic parameters, such as the focal length, the scale factors for transformation along with the x and y directions and the like, which can be expressed as following formula (6):

$$x_i = \frac{x_{size}}{2} + fS_x \frac{X_V}{Z_V\cos\theta + H\sin\theta}, \quad y_i = \frac{y_{size}}{2} + fS_y \frac{Z_V\sin\theta - H\cos\theta}{Z_V\cos\theta + H\sin\theta}, \quad (6)$$

wherein, $f, S_x, S_y$ are the camera intrinsic parameters, which represents the focal length, the scale factors for transformation along with the x and y directions, respectively. The above-mentioned process of transforming the world coordinate system to the image plane coordinate system is called perspective projection transformation.

Conversely, the GPU 130 may also transform any point $(x_i, y_i)$ on the image plane into a road plane $(X_v\text{-}Z_v)$ using an inverse perspective projection transformation, and its transformation formula (7) can be expressed as follows:

$$Z_V = \frac{H \times \left( fS_y\cos\theta - \left( y_i - \frac{y_{size}}{2} \right)\sin\theta \right)}{fS_y\sin\theta + \left( y_i - \frac{y_{size}}{2} \right)\cos\theta}, \quad (7)$$

$$X_V = \frac{\left( x_i - \frac{x_{size}}{2} \right)(Z_V\cos\theta + H\sin\theta)}{fS_x}.$$

Figure 4:
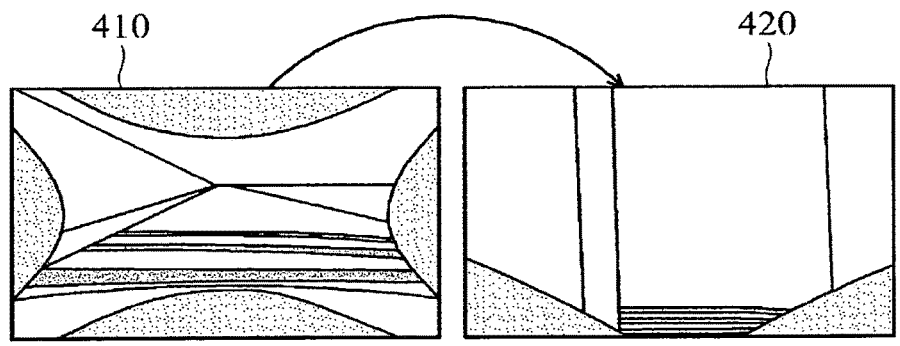
FIG. 4 is a schematic diagram illustrating an exemplary embodiment of using the inverse perspective projection transformation to transform a distortion-corrected image to a bird's-eye view image.

In other words, the GPU 130 may transform the distortion-corrected image into a bird's-eye view image, i.e., the road plane $(X_r\text{-}Z_r)$, through the above inverse perspective projection transformation process, as shown in FIG. 4. FIG. 4 is a schematic diagram illustrating an exemplary embodiment of using the inverse perspective projection transformation to transform a distortion-corrected image to a bird's-eye view image. As shown in FIG. 4, the distortion-corrected image 410 is transformed into a bird's-eye view image 420 through an inverse perspective projection transformation.

Figure 6:
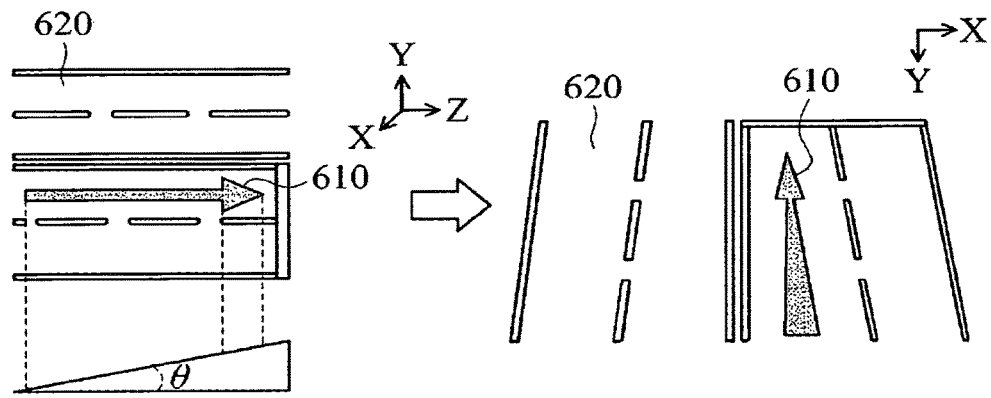
FIG. 6 is a schematic diagram illustrating an exemplary embodiment of superimposing the virtual guiding indication on a bird's-eye view image through an inverse perspective projection transformation.
Figure 7:
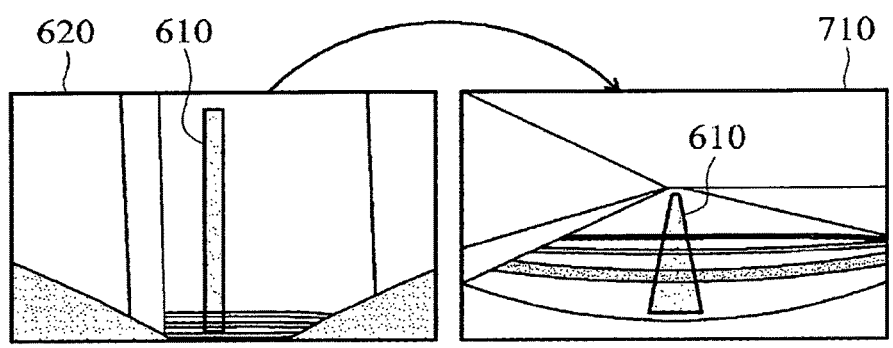
FIG. 7 is a schematic diagram illustrating at exemplary embodiment of superimposing the virtual guiding indication on an original reality image.

In the embodiments of the application, in order to increase the accuracy of augmented reality in the reality image superimposing the virtual guiding indication thereon, the virtual guiding indication is first superimposed on the bird's-eye view image, that is, the road plane $(X_v\text{-}Z_v)$, through the inverse perspective projection transformation and then the bird's-eye bird image superimposed with the virtual guiding indication is restored to the original reality image through a perspective projection transformation in reverse, and then a guiding image with the correct proportion relationship can be generated and the image including the guiding image can be output. By doing so, the virtual guiding indication can be superimposed on the reality image with respect to the correct proportion relationship for the pixels of the reality image, thus providing the user with more accurate augmented reality three-dimensional guidance to enable the guiding indication to be superimposed on the drivable area of the reality image with the correct proportion, and to be rendered with a translucent effect. Please refer to FIGS. 6 and 7. FIG. 6 is a schematic diagram illustrating an exemplary embodiment of superimposing the virtual guiding indication on a bird's-eye view image through an inverse perspective projection transformation while FIG. 7 is a schematic diagram illustrating an exemplary embodiment of superimposing the virtual guiding indication on an original reality image. As shown in FIG. 6, the virtual guiding indication 610 is being superimposed on the bird's-eye view image 620 through the inverse perspective projection transformation. As shown in FIG. 7, the virtual guiding indication 610 is being further superimposed on the original reality image 710 corresponding to the bird's-eye view image 620.

Above superimposed example of the virtual guiding image and the reality image superimposes the virtual guiding image on the reality image with a correct proportional relationship by using the perspective projection transformation method. However, the above-mentioned method assumes that the image is projected on a horizontal road, that is, the distance between the road plane on which the vehicle is traveling and the lens remains unchanged. When the vehicle is traveling on a road with a height variation, this method may cause an error overlay effect. When the road has a height variation, the GPU 130 needs to additionally consider the road height information (altitude) so as to avoid the floating phenomenon generated when the overlay image is generated. Therefore, in some embodiments, the GPU 130 further considers the height variation of the road during the superposition of the virtual guiding indication and the reality image, and regards the altitude of the road plane as a rotation angle of the target axis. Depending on the rotation angle, the camera coordinate system is associated with the world coordinate system for the road plane under the height change, and finally the inverse perspective projection transformation relation under the height change can be obtained to achieve a correct AR superimposing effect.

Figure 5:
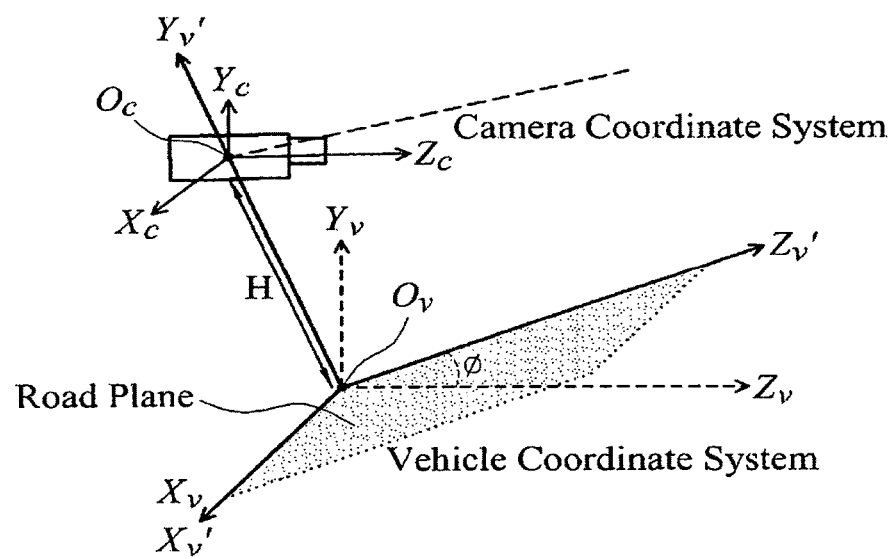
FIG. 5 is a schematic diagram illustrating an exemplary embodiment of the relationship between a vehicle coordinate system and a camera coordinate system with road height information.

FIG. 5 is a schematic diagram illustrating an exemplary embodiment of the relationship between a vehicle coordinate system and a camera coordinate system with road height information. As shown in FIG. 5, the vehicle coordinate system and the camera coordinate system can be changed as shown in below, wherein $(X_c, Y_c, Z_c)$ represents the camera coordinate system, $(X_V, Y_V, Z_V)$ represents the vehicle coordinate system (world coordinate system) under a horizontal road that does not have a height variation, and $(X_V', Y_V', Z_V')$ represents a vehicle coordinate system that changes due to a change in road height.

Next, the GPU 130 takes into account the altitude of the road, i.e., the angle $\phi$ as shown in FIG. 5, at this time, the road plane will become $(X_v'\text{-}Z_v')$; therefore, any point located in the road plane $(X_v'\text{-}Z_v')$ within the new vehicle coordinate system can still be transformed to the camera coordinate system $P_C(X_C, Y_C, Z_C)$ using the transformation matrix of the above formula (4).

To be more specific, the GPU 130 first considers transforming the current vehicle coordinate system into a world coordinate system as shown in the following formula (8):

$$\begin{bmatrix} X_V \\ Y_V \\ Z_V \\ 1 \end{bmatrix} = M_{V'V} \begin{bmatrix} X_V' \\ Y_V' \\ Z_V' \\ 1 \end{bmatrix} = \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \begin{bmatrix} X_V' \\ Y_V' \\ Z_V' \\ 1 \end{bmatrix}. \quad (8)$$

Next, the GPU 130 transforms the world coordinate system into a coordinate system related to the lens according to the following formula (9):

$$\begin{bmatrix} X_c \\ Y_c \\ Z_c \\ 1 \end{bmatrix} = M_{V,C} \begin{bmatrix} X_V \\ Y_V \\ Z_V \\ 1 \end{bmatrix} = \begin{bmatrix} 1 & 0 & 0 & 0 \\ 0 & \cos\theta & \sin\theta & -H\cos\theta \\ 0 & -\sin\theta & \cos\theta & H\sin\theta \\ 0 & 0 & 0 & 1 \end{bmatrix} \begin{bmatrix} X_V \\ Y_V \\ Z_V \\ 1 \end{bmatrix}. \quad (9)$$

With the above formula (8) and formula (9), the GPU 130 can obtain a relation (equation) (10) as below:

$$\begin{bmatrix} X_c \\ Y_c \\ Z_c \\ 1 \end{bmatrix} = \begin{bmatrix} 1 & 0 & 0 & 0 \\ 0 & \cos\theta & \sin\theta & -H\cos\theta \\ 0 & -\sin\theta & \cos\theta & H\sin\theta \\ 0 & 0 & 0 & 1 \end{bmatrix} \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \begin{bmatrix} X'_V \\ Y'_V \\ Z'_V \\ 1 \end{bmatrix} \quad (10)$$

$$= \begin{bmatrix} X'_V \\ (\bar{c}\theta\bar{c}\phi + \bar{s}\theta\bar{s}\phi)Y'_V + (-\bar{c}\theta\bar{s}\phi + \bar{s}\theta\bar{c}\phi)Z'_V - H\bar{c}\theta \\ (-\bar{s}\theta\bar{c}\phi + \bar{c}\theta\bar{s}\phi)Y'_V + (\bar{s}\theta\bar{s}\phi + \bar{c}\theta\bar{c}\phi)Z'_V + H\bar{s}\theta \\ 1 \end{bmatrix}.$$

Then, the GPU 130 may transform the camera coordinate system into an image plane coordinate system according to the camera pinhole imaging principle, as shown in the following formula (11):

$$x_i = \frac{x_{size}}{2} + fS_x \frac{X'_V}{(-\bar{s}\theta\bar{c}\phi + \bar{c}\theta\bar{s}\phi)Y'_V + (\bar{s}\theta\bar{s}\phi + \bar{c}\theta\bar{c}\phi)Z'_V + H\bar{s}\theta}, \quad (11)$$

$$y_i = \frac{y_{size}}{2} + fS_y \frac{(\bar{c}\theta\bar{c}\phi + \bar{s}\theta\bar{s}\phi)Y'_V + (-\bar{c}\theta\bar{s}\phi + \bar{s}\theta\bar{c}\phi)Z'_V - H\bar{c}\theta}{(-\bar{s}\theta\bar{c}\phi + \bar{c}\theta\bar{s}\phi)Y'_V + (\bar{s}\theta\bar{s}\phi + \bar{c}\theta\bar{c}\phi)Z'_V + H\bar{s}\theta},$$

where $\bar{s}=\sin$ and $\bar{c}=\cos$. Equation (11) can be referred to as the perspective projection transformation relationship with a height variation on the road. On the other hand, the GPU 130 may use the above formula (11) to calculate an inverse perspective projection transformation relationship, which can transform any point $(x_i,y_i)$ on the image plane to a point on the road plane $(X_v'$-$Z_v')$. Therefore, the GPU 130 may superimpose the virtual guiding indication with the correct proportional relationship with respect to the reality image pixel of the reality image through the above method, so as to provide the user with more accurate augmented reality 3D direction guidance.

Figure 8A:
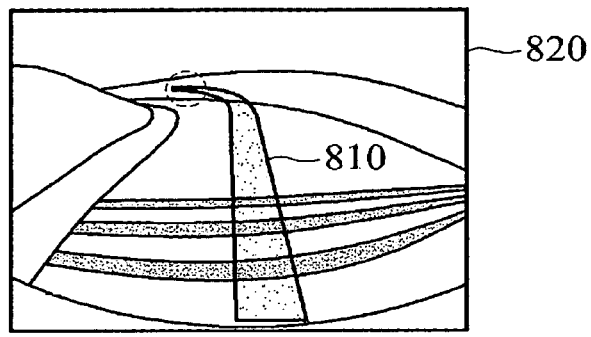
Figure 8B:
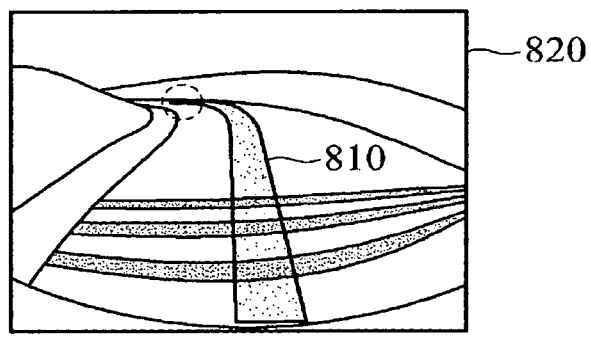
FIG. 8B is a schematic diagram illustrating an exemplary embodiment of a superimposing effect of the virtual guiding indication and the reality image that considers the height variation on the road plane.

Please refer to FIGS. 8A and 8B. FIG. 8A is a schematic diagram illustrating an exemplary embodiment of a superimposing effect of a virtual guiding indication and a reality image without considering the height variation on the road plane while FIG. 8B is a schematic diagram illustrating an exemplary embodiment of a superimposing effect of the virtual guiding indication and the reality image that considers the height variation on the road plane. In FIG. 8A, it can be observed that the virtual guiding indication 810 displayed in the reality image 820 has a false superimposing effect during the superimposing operation due to the height variation of the road plane, such that the virtual guiding indication 810 deviates from the road plane and appears to float and point to the sky. It can be observed in FIG. 8B that, in the present application, the GPU 130 can regard the altitude data of the road plane as a rotation angle of a target axis, and make the camera coordinate system correspond to the world coordinate system for the road plane under the height variation according to the rotation angle. Finally, the inverse perspective projection transformation relation under the height variation can be obtained, thereby fitting the virtual guiding indication 810 in the reality image 820 according to the correct the proportional relationship of the pixels, and achieving a correct AR superimposing effect.

Figure 9:
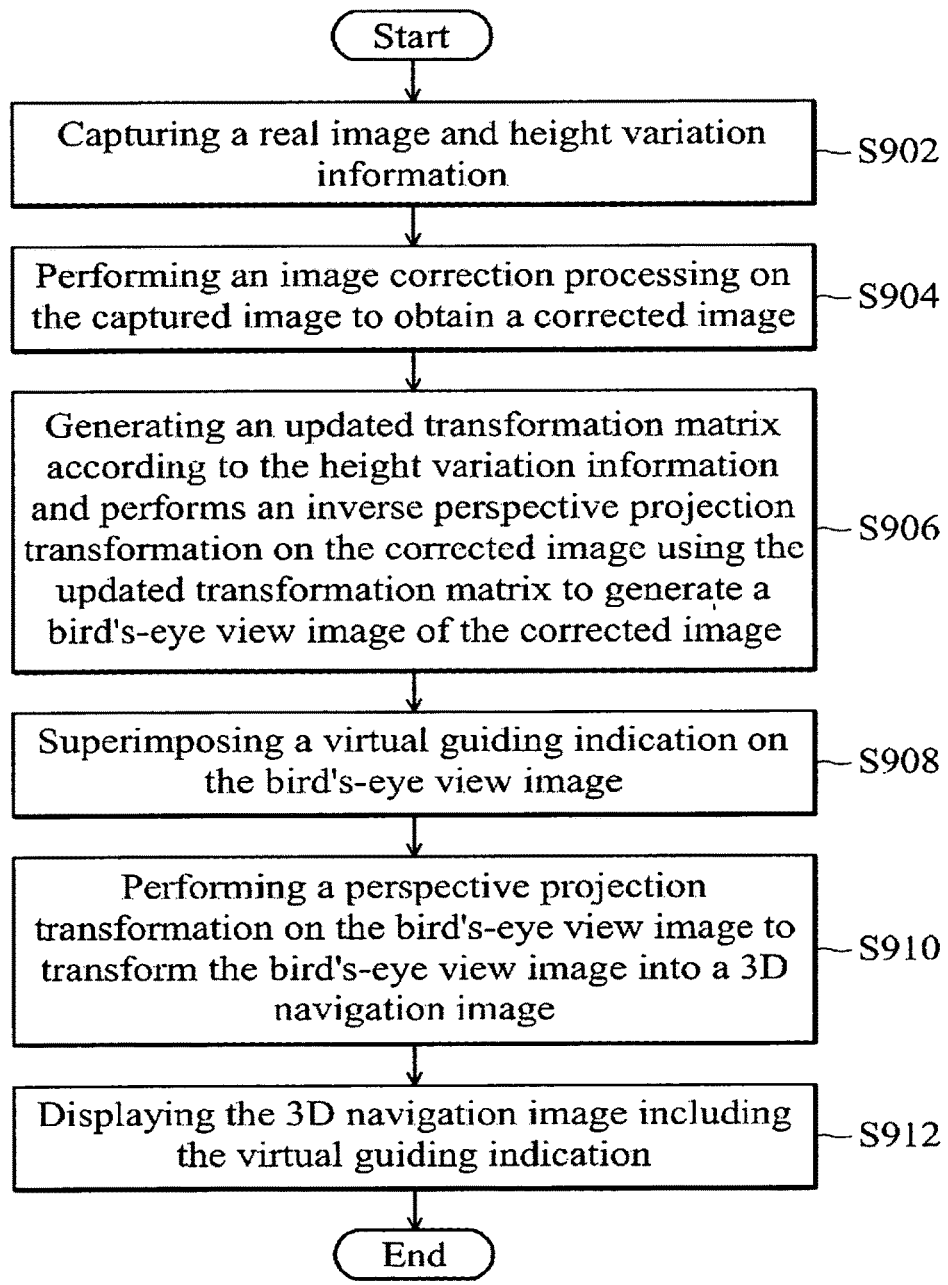
FIG. 9 is a flowchart of a superimposing method for superimposing a virtual guiding indication and a reality image according to an embodiment of the application.

FIG. 9 is a flowchart of a superimposing method for superimposing a virtual guiding indication and a reality image according to an embodiment of the application. Please refer together with FIG. 1 and FIG. 9. The superimposing method for superimposing the virtual guiding indication and the reality image of the application may be applied to a superimposition device of a virtual guiding indication and a reality image, wherein the superimposition device is deposited on a vehicle. For example, the superimposing method can be applied to the superimposition device 100 of the virtual guiding indication and the reality image as shown in FIG. 1 and performed by the processor 120.

First, in step S902, the processor 120 captures a reality image through the image capturing device 110 and retrieves height variation information through the GPS unit 172, the height information generating unit 174, and the GIS unit 176, and as in step S904, performs an image correction processing on the captured image to obtain a corrected image through the GPU 130. Specifically, in some embodiments, the GPU 130 may obtain altitude information corresponding to the travel route by comparing the vehicle location information provided by the GPS unit 172, the road gradient information provided by the GIS information of the GIS unit 176, and the height information provided by the height information generating unit 174 to determine whether the height is changed so as to obtain the height variation information. The captured image is a scene-distorted image, and the corrected image is a distortion-corrected undistorted image. In some embodiments, the image correction processing at least includes a camera parameter correction operation and an image distortion correction operation. Specifically, the reality image may be a scene image of a road ahead, which is a scene-distorted image. Therefore, the GPU 130 first performs a camera parameter correction operation on the image, and uses the camera's intrinsic parameters (e.g., the aforementioned scale factors $S_x, S_y$ for the scaling along with x-axis and y-axis of the image plane, respectively, and focal length $f$) to perform a camera parameter measurement to adjust the distortion in the scene-distorted image caused by different camera parameters to obtain an adjusted image, and perform a distortion correction operation on the adjusted image, using a distortion correction algorithm such as the above equation (3) to transform the scene-distorted image into an undistorted scene image. This undistorted scene image is the corrected image.

After obtaining the corrected image, in step S906, the GPU 130 generates an updated transformation matrix according to the height variation information and performs an inverse perspective projection transformation on the corrected image using the updated transformation matrix to generate a bird's-eye view image of the corrected image by using the inverse perspective projection transformation technique to transform the 3D reality image into a two-dimensional (2D) bird's-eye view image, and in step S908, the GPU 130 superimposes a virtual guiding indication on the transformed bird's-eye view image. The virtual guiding indication is generated according to a route planning information and the virtual guiding indication is fitted to the road plane shown in the bird's-eye view image.

More particularly, as described above, since the change of the altitude of the road may cause an error in the inverse perspective projection transformation, in this embodiment, during the image superimposing process, the GPU 130 updates the transformation matrix originally used for the horizontal road according to the change of the altitude of the road to generate an updated transformation matrix (e.g., using the aforementioned formulas (8)-(10)), and uses the updated transformation matrix to perform the inverse perspective projection transformation (e.g., through the aforementioned formula (11)) to draw the virtual guiding indication on the bird's-eye view image under the height variation in which the virtual guiding indication drawn will be fitted to the bird's-eye view image corresponding to the reality image, thereby providing the virtual guiding indication with more correct pixel proportional relationship in the reality image, and avoiding the appearance of an erroneous display that appears to float and point to the sky caused by directly superimposing the virtual guiding indication on the original image. In some embodiments, the GPU 130 can determine the width of the virtual guiding indication according to the width of the driving lanes of road, such that the virtual guiding indication may have a proportional relation with a driving lane that the vehicle is driving in the reality image, such as one-half or one-third of the width of the driving lanes, but the application is not limited thereto. For example, when the width of the driving lane is 30 cm, the GPU may set the maximum width of the virtual guiding indication to be 15 cm or 10 cm, and then draw the virtual guiding indication on the bird's-eye view image according to the maximum width of the virtual guiding indication. The width of the virtual guiding indication will be shortened or more elongated as the distance approaches to generate a visual effect that is close to the situation seen in the real scene.

After the virtual guiding indication is fitted/attached to the bird's-eye view image under the height variation, in step S910, the GPU 130 performs a perspective projection transformation on the bird's-eye view image to transform the bird's-eye view image into a 3D navigation image through the perspective projection transformation technique. To be more specific, the GPU 130 transforms the bird's-eye view image into the image coordinate system corresponding to the reality image by using a corresponding perspective projection (e.g., using the aforementioned formula) to generate a 3D navigation image including a 3D virtual guiding indication, thereby providing the virtual guiding indication with more correct pixel proportional relationship in the reality image and avoiding the appearance of an erroneous display that appears to float and point to the sky caused by directly superimposing the virtual guiding indication on the original image.

Thereafter, in step S912, the processor 120 outputs the 3D navigation image including the 3D virtual guiding indication generated by the GPU 130 to the display device 150 through the image output interface 164 to enable the display device 150 to display the 3D navigation image including the virtual guiding indication, wherein the 3D navigation image displays a virtual guiding indication in a reality image to provide an AR image. As the 3D navigation image generated is already attached to the road plane, erroneous display that appears to float and point to the sky will be disappear, and thus the user can be provided with a correct AR 3D guiding indication. In some embodiments, the display device 150 may be disposed near the driver position of the vehicle. For example, the display device 150 may be a head-up display (HUD) disposed on the windshield of the vehicle for displaying the image of road ahead superimposed with the virtual guiding indication to increase the convenience of use.

Figure 10:
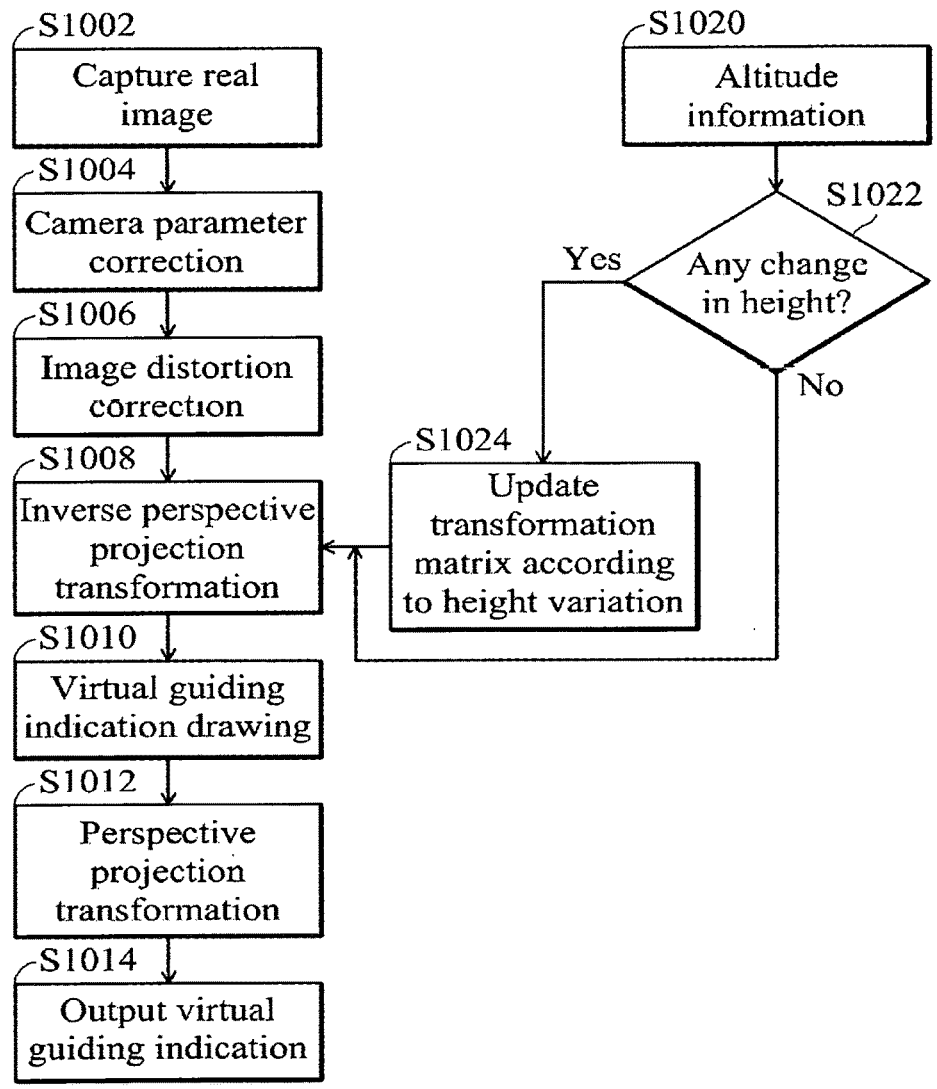
FIG. 10 is a flowchart of a superimposing method for superimposing a virtual guiding indication and a reality image according to another embodiment of the application.

FIG. 10 is a flowchart of a superimposing method for superimposing a virtual guiding indication and a reality image according to another embodiment of the application. Please refer together with FIG. 1 and FIG. 10. The superimposing method for superimposing the virtual guiding indication and the reality image of the application may be applied to a superimposition device of a virtual guiding indication and a reality image, wherein the superimposition device is deposited on a vehicle. For example, the superimposing method can be applied to the superimposition device 100 of the virtual guiding indication and the reality image as shown in FIG. 1 and performed by the processor 120.

First, the processor 120 captures a reality image through the image capturing device 110 (step S1002), and then performs a camera parameter correction (step S1004) and an image distortion correction (step S1006) on the captured scene images through the GPU 130 to convert the scene-distorted image into an undistorted image.

Thereafter, the processor 120 performs, through the GPU 130, an inverse perspective projection transformation on the reality image (step S1008) to transform the reality image into a bird's-eye view image (as shown in FIG. 4), draws a virtual guiding indication thereon (step S1010) and corresponds to the reality image by the perspective projection transformation (step S1012).

On the other hand, the processor 120 continuously obtains the altitude information change via the GPS unit 172, the height information generating unit 174, and the GIS unit 176 (step S1020) and then determines whether there is a change in height (step S1022). That is, the front road is with a horizontal plane or a graded plane. If not, the transformation matrix of the inverse perspective projection transformation is not necessarily updated. Contrarily, if there is a change in height, the transformation matrix is updated according to the height variation (step S1024), and the updated transformation matrix is used to perform the inverse perspective projection transformation using the altitude data of the road plane as a rotation angle of the target axis (step S1008), to transform the reality image to a bird's-eye view image (as shown in FIG. 4) and a virtual guiding indication is drawn thereon (step S1010). The virtual guiding indication drawn thereon is then transformed into the reality image coordinates through the perspective projection transformation (step S1012). Finally, the navigation image including the virtual guiding indication is output by the display device 150, thereby providing the output virtual guiding indication with more correct pixel proportional relationship in the reality image and avoiding the appearance of an erroneous display that appears to float and point to the sky caused by directly superimposing the virtual guiding indication on the original image, thus providing the drivers with more accurate and intuitive 3D guiding indication (step S1014).

Therefore, according to the superimposition devices of a virtual guiding indication and a reality image and related superimposition methods thereof of the present application, altitude data of the road plane can be considered as a rotation angle of a coordinate axis, and points of the camera coordinate system can be transformed into points of the world coordinate system for a road plane with a height variation according to the rotation angle to obtain the inverse perspective projection transformation relation under the change in height to achieve a correct augmented reality overlay effect and achieve the effectiveness of navigation information with augmented reality and security monitoring, thereby solving the existing problem of the traditional navigation system having inadequate and insufficient road information. Moreover, the superimposition device of the virtual guiding indication and the reality image and superimposition methods thereof of the application can effectively solve the problem wherein insufficient navigation causes the driver to miss the predetermined route and lead to dangerous driving behavior, and also effectively solve the lofty displaying and fitting problems of the guiding indication caused by road fluctuations in the prior art.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the application has been described by way of example and in terms of exemplary embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

SYMBOL DESCRIPTION

100~superimposed device of virtual guide icon and reality image;
110~image capturing device;
120~processor;
130~graphics processing unit (GPU);
140~storage unit;
141, 142~memory;
150~display device;
162~image input interface;
164~image output interface;
172~global positioning system (GPS) unit;
174~height information generating unit;
176~geographic information system (GIS) unit;
410, 420~images;
610~virtual guiding indication;
620~images;
710~images;
810~virtual guiding indication;
820~images;
S902, S904, S906, . . . , S912~steps; and
S1002, S1004, S1006, . . . , S1024~steps.

What is claimed is:

1. A superimposition device of a virtual guiding indication and a reality image, comprising:
at least one image capturing device deposited in front of a vehicle for capturing a reality image including a real-time scene,
a processor connected to the image capturing device for receiving the reality image and obtaining height variation information, wherein the height variation information includes a current altitude data of the vehicle and an altitude data for the road in front of the vehicle;
a graphic processing unit (GPU) connected to the processor for performing an image correction processing on the reality image to obtain a corrected image, generating an updated transformation matrix according to the height variation information, performing an inverse perspective projection transformation on the corrected image using the updated transformation matrix to generate a bird's-eye view image of the corrected image, generating a virtual guiding indication according to a route planning information, and superimposing the virtual guiding indication on the bird's-eye view image and then performing a perspective projection transformation on the bird's-eye view image to transform the bird's-eye view image into a three-dimensional (3D) navigation image, wherein the 3D navigation image includes the virtual guiding indication; and
a display device connected to the processor for displaying the 3D navigation image.

2. The superimposition device as claimed in claim 1, further comprising:
a global positioning system (GPS) unit, providing and outputting a real-time location of the vehicle;
a geographic information system (GIS) unit, storing map information; and
a height information unit, providing the current altitude data of the vehicle and the altitude data for the road in front of the vehicle.

3. The superimposition device as claimed in claim 2, wherein the height information unit is an altimeter.

4. The superimposition device as claimed in claim 2, wherein height information provided by the GIS unit is compared with height information provided by the GPS unit to obtain the height variation information that represents a gradient of the road traffic ahead.

5. The superimposition device as claimed in claim 1, wherein the virtual guiding indication is a 3D indication which is in equally proportional changes with distance and height variation and translucently attached to the ground.

6. The superimposition device as claimed in claim 1, wherein the display device is a head-up display (HUD) device disposed next to the driving position of the vehicle to display the 3D navigation image that includes information indicating road traffic ahead superimposed with the virtual guiding indication.

7. The superimposition device as claimed in claim 1, wherein the virtual guiding indication generated by the GPU is performed with the inverse perspective projection transformation according to the updated transformation matrix to correspond to an image coordinate system of the bird's-eye view image with the height variation, and to correspond to an image coordinate system of the reality image using the perspective projection transformation so as to superimpose the virtual guiding indication on the reality image.

8. The superimposition device as claimed in claim 1, wherein the display device further comprises a user interface for displaying the current altitude data of the vehicle and the altitude data for the road ahead image.

9. The superimposition device as claimed in claim 1, wherein the GPU performs the inverse perspective projection transformation using an inverse perspective projection algorithm that takes into account a height variation to generate the virtual guiding indication in the reality image.

10. The superimposition device as claimed in claim 1, wherein the virtual guiding indication has a proportional relation with a driving lane that the vehicle is driving in within the reality image.

11. A superimposition method for superimposing a virtual guiding indication and a reality image applied to a superimposition device deposited on a vehicle and implemented by the superimposition device, the method comprising:

capturing a reality image including a real-time scene and obtaining height variation information, wherein the height variation information includes a current altitude data of the superimposition device and an altitude data for the road in front of the vehicle;

performing an image correction processing on the reality image to obtain a corrected image;

generating an updated transformation matrix according to the height variation information and performing an inverse perspective projection transformation on the corrected image using the updated transformation matrix to generate a bird's-eye view image of the corrected image;

generating a virtual guiding indication according to a route planning information and superimposing the virtual guiding indication on the bird's-eye view image; and performing a perspective projection transformation on the bird's-eye view image to transform the bird's-eye view image into a three-dimensional (3D) navigation image, wherein the 3D navigation image includes the virtual guiding indication.

12. The superimposition method as claimed in claim 11, wherein the corrected image is a non-distorted image and the correction processing includes a camera parameter correction processing and a distortion correction processing.

13. The superimposition method as claimed in claim 11, further comprising:

receiving height information from a geographic information system (GIS) unit and height information from a global positioning system (GPS) unit; and compared the height information provided by the GIS unit with the height information provided by the GPS unit to obtain the height variation information that represents a gradient of the road traffic ahead.

14. The superimposition method as claimed in claim 11, wherein the virtual guiding indication is a 3D indication which is in equally proportional changes with distance and height variation and translucently attached to the ground.

15. The superimposition method as claimed in claim 11, further comprising:

performing the inverse perspective projection transformation using an inverse perspective projection algorithm that takes into account a height variation to generate the virtual guiding indication in the reality image.

16. The superimposition method as claimed in claim 11, further comprising:

displaying the 3D navigation image.

* * * * *